(12) United States Patent
Beard et al.

(10) Patent No.: US 10,967,736 B2
(45) Date of Patent: Apr. 6, 2021

(54) VEHICLE DASHBOARD

(71) Applicant: International Business Machines Corporation, Armonk, NY (US)

(72) Inventors: Darren R. Beard, Chandlers Ford (GB); Jenny Jing He, Chandlers Ford (GB); Andrew Wright, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 16/252,753

(22) Filed: Jan. 21, 2019

(65) Prior Publication Data

US 2020/0231038 A1    Jul. 23, 2020

(51) Int. Cl.
  *B60K 35/00*  (2006.01)
  *G02B 3/14*  (2006.01)
  *G02F 1/29*  (2006.01)

(52) U.S. Cl.
  CPC ........... *B60K 35/00* (2013.01); *G02B 3/14* (2013.01); *G02F 1/29* (2013.01); *B60K 2370/18* (2019.05); *B60K 2370/20* (2019.05); *B60K 2370/736* (2019.05); *G02F 2001/294* (2013.01)

(58) Field of Classification Search
  CPC ...... G02F 1/29; G02F 1/292; G02F 2001/291; G02F 2001/294; B82Y 20/00; B60K 35/00; B60K 2370/18; B60K 2370/20; B60K 2370/736; B60K 37/02; G02B 3/14

USPC .................................................. 359/351, 315
  See application file for complete search history.

(56) References Cited

U.S. PATENT DOCUMENTS

| | | | |
|---|---|---|---|
| 7,390,088 B2 | 6/2008 | Goodall et al. | |
| 8,939,579 B2* | 1/2015 | Agurok | G02C 7/081 351/205 |
| 9,852,496 B2* | 12/2017 | Marchand | G06T 5/006 |
| 2002/0196201 A1* | 12/2002 | Rosen | H04N 7/181 345/7 |
| 2014/0111644 A1 | 4/2014 | Fannon | |
| 2019/0187455 A1* | 6/2019 | Iwasaki | G02B 3/14 |

OTHER PUBLICATIONS

Potenza, These Smart Glases Automatically Focus on What You're Looking At, The Verge, Jan. 29, 2017, https://www.theverge.com/2017/1/29/14403924/smart-glasses-automatic-focus-presbyopia-ces-2017, pp. 1-4.
Wikipedia "Adjustable-focus eyeglasses" retrieved at: https://en.wikipedia.org/wiki/Adjustable-focus_eyeglasses; downloaded Nov. 16, 2020; 4 pgs.

* cited by examiner

*Primary Examiner* — Mohammed A Hasan
(74) *Attorney, Agent, or Firm* — Cantor Colburn LLP; Teddi Maranzano

(57) ABSTRACT

A vehicle dashboard instrument display for displaying vehicle operating information to a driver includes a lens system adjacent the instruments and interposed between the driver and the instruments. The lens system includes a variable focus lens operable for, responsive to input from a lens controller, adjusting to a focal length suitable for countering the visual impairment of the driver to render the instruments more easily readable by the driver.

18 Claims, 3 Drawing Sheets

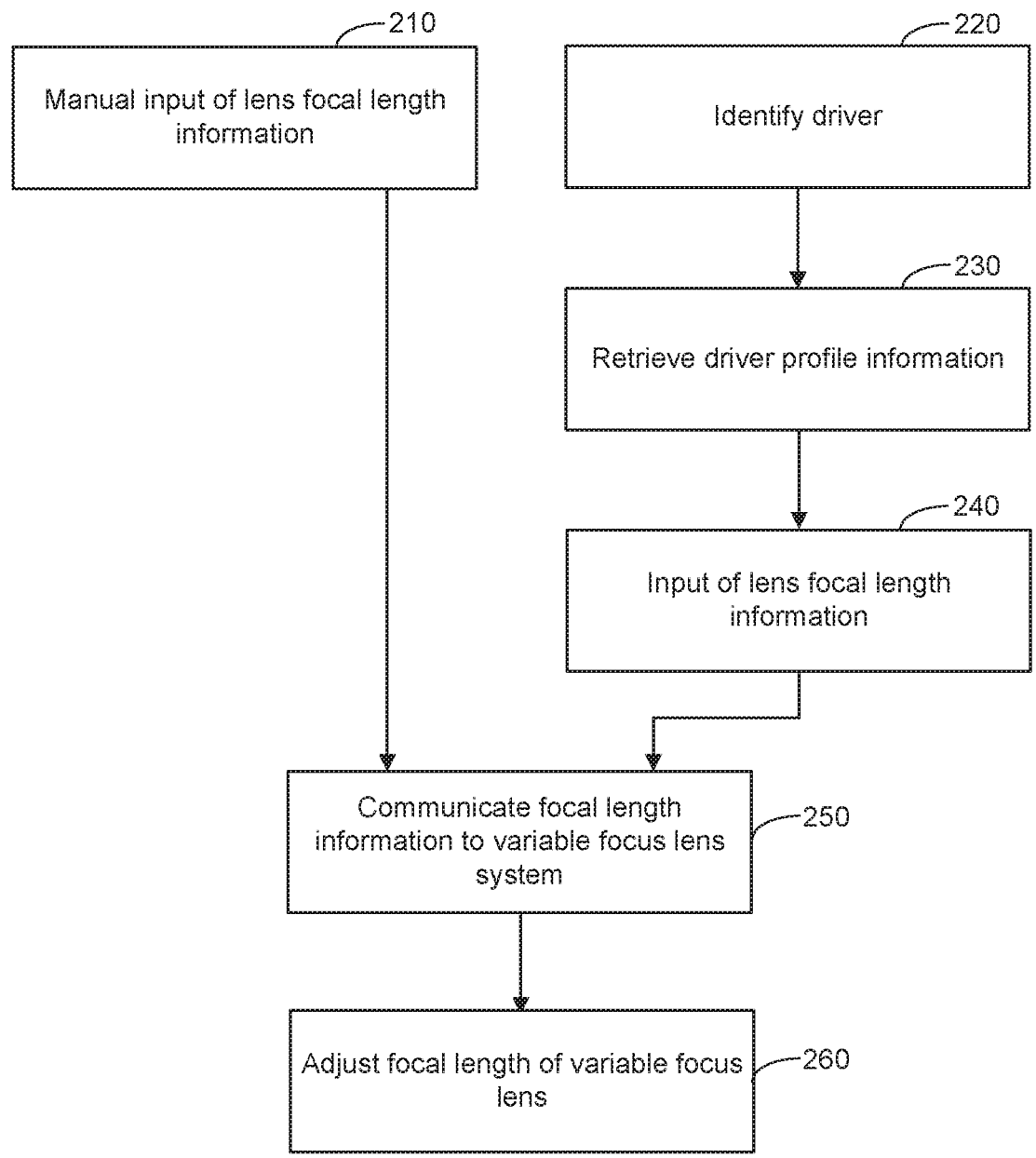

VEHICLE DASHBOARD

BACKGROUND

The invention relates to the field of vehicle dashboards. More particularly the invention relates to instrument displays of vehicle dashboards adaptable to the vision needs of individual users.

Problems arise for a vehicle driver who has a visual deficiency which prevents the driver from seeing clearly both the road ahead and the instruments of the vehicle dashboard, for example the speedometer or fuel gauge. A driver may suffer from hypermetropia (also known as hyperopia, far-sightedness or long-sightedness) a visual condition which prevents unaided focussing on objects at a normal reading distance from the eye. This means that the driver can view the road ahead unaided but cannot view comfortably the vehicle instruments closer to the eye without using a visual correcting device, for example vision correcting eyeglasses. Presbyopia is a further condition which is characterised by an age-related hardening of the eye lens which prevents easy accommodation to focus on close objects such as a vehicle dashboard without corrective eyeglasses. Most people over the age of 45 are affected to one degree or another. One solution to the need to be able to see the road ahead and the vehicle instruments for such drivers is to use corrective visual aids such as eyeglasses providing regions having different vision correcting facility. These may be, for example, eyeglasses with bi-focal, tri-focal or varifocal lenses. Many drivers do not like such corrective eyeglasses. An adaptation of the vehicle to the visual needs of such a driver would be more acceptable. However, adapting the vehicle for the visual needs of a specific driver would make it difficult for a driver with different visual needs to drive the vehicle.

SUMMARY

In accordance with a first aspect of the invention, there is provided a vehicle dashboard instrument display including one or more vehicle instruments for displaying vehicle operating information to a driver. A lens system is provided adjacent the one or more instruments and interposed between the driver and the one or more instruments. The lens system includes a variable focus lens operable for, responsive to input from a lens controller, adjusting to a focal length suitable for countering the visual impairment of the driver to render the one or more instruments more easily readable by the driver.

In another aspect, the invention provides a vehicle dashboard instrument for displaying vehicle operating information to a driver. A lens system is provided adjacent the instrument and interposed between the driver and the instrument. The lens system includes a variable focus lens operable for, responsive to input from a lens controller, adjusting to a focal length suitable for countering the visual impairment of the driver to render the instrument more easily readable by the driver.

In other aspects, the invention provides a method and computer program product for countering the visual impairment of a driver. The method includes providing a lens system adjacent one or more instruments of a vehicle dashboard and interposed between the driver and the one or more instruments. The lens system includes a variable focus lens. The method includes receiving input identifying a lens focal length value appropriate for countering the visual impairment of the driver and adjusting the lens focal length to that value.

BRIEF DESCRIPTION OF THE DRAWINGS

Preferred embodiments of the present invention will now be described by way of example only, with reference to the accompanying drawings in which:

FIG. 5 is a flowchart depicting the operation of embodiments of the invention.

DETAILED DESCRIPTION

Aspects of the invention provide a vehicle dashboard instrument display, a vehicle dashboard instrument, and a method for countering visual impairments of a plurality of drivers. Impairments may include, for example, hypermetropia or presbyopia. Aspects of the invention include a lens system overlying and adjacent a dashboard display and including a lens having a variable focal length.

Figure 1:
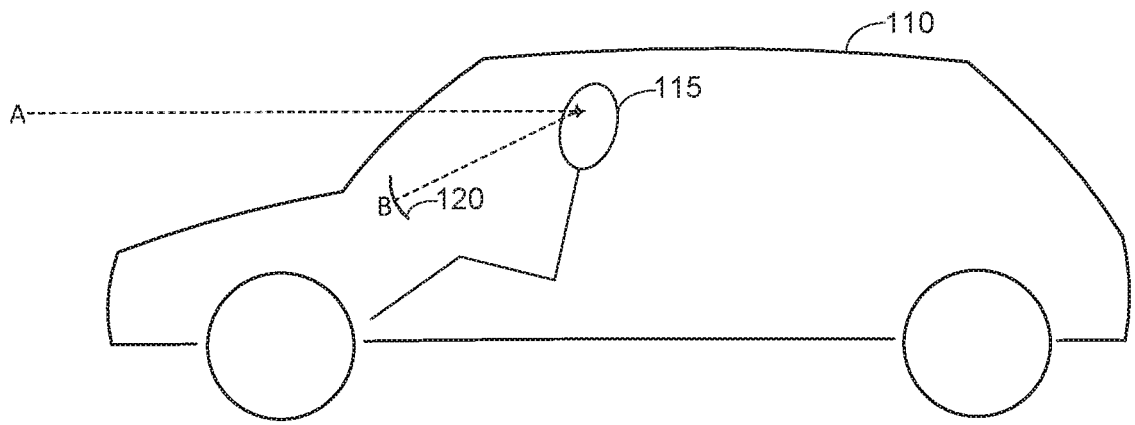
FIG. 1 depicts a motor vehicle illustrating a problem addressed by embodiments of the invention.

FIG. 1 illustrates a problem addressed by embodiments of the present invention. Driver 115 of a vehicle, for example motor vehicle 110, views a relatively distant object in their line of sight, represented by the dashed line to A in the figure. Driver 115 suffers from a visual impairment, for example age-related presbyopia. Driver 115 focuses comfortably on distant object A. Driver 115 cannot comfortably re-focus their eyes on dashboard instrument display 120 which is relatively close to their eyes, represented by dashed line to B in the figure.

Figure 2:
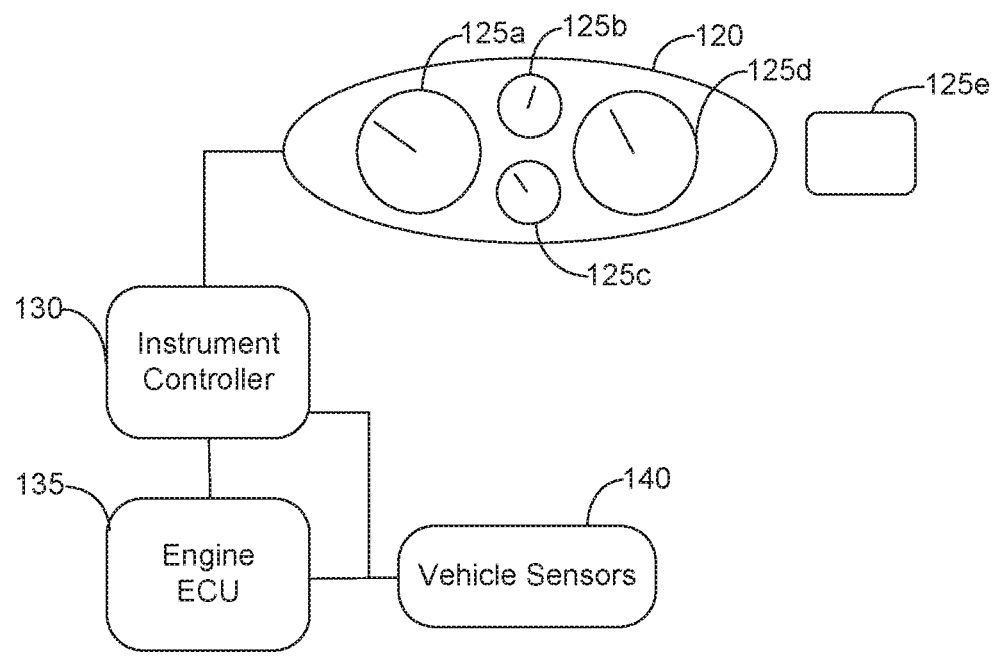
FIG. 2 depicts a known motor vehicle dashboard instrument display.

FIG. 2 illustrates an example of a known vehicle dashboard instrument display 120 as it appears to a driver of the vehicle. Dashboard instrument display 120 comprises instruments 125a-125d. Each of instruments 125a-125d displays an indication of the value of a vehicle operating parameter. Examples of such instruments are speedometer, engine revolutions counter, fuel level gauge, and engine temperature gauge. Each of these instruments receives sensor output signals from respective vehicle sensor or sensors 140. Vehicle sensors 140 may transmit respective sensor output signals to instrument controller or controllers 130. Instrument controller 130 and vehicle sensors 140 may also be in communication with vehicle engine electronic control unit (ECU) 135. Instruments 125a-125d may each comprise a mechanical construction comprising a dial comprising a moving indicating needle and calibrated scale, or alternatively a solid-state display, for example a liquid crystal or light emitting diode display. Instrument 125e is an example instrument not linked directly to vehicle sensors, for example a navigation system such as a satellite navigation system (satnav) receiving Global Positioning System (GPS) signals. It will be apparent that the schematic layout of FIG. 2 is an exemplary arrangement only. Many other arrangements and variations are possible in other examples of known vehicle dashboard instrument displays.

Figure 3:
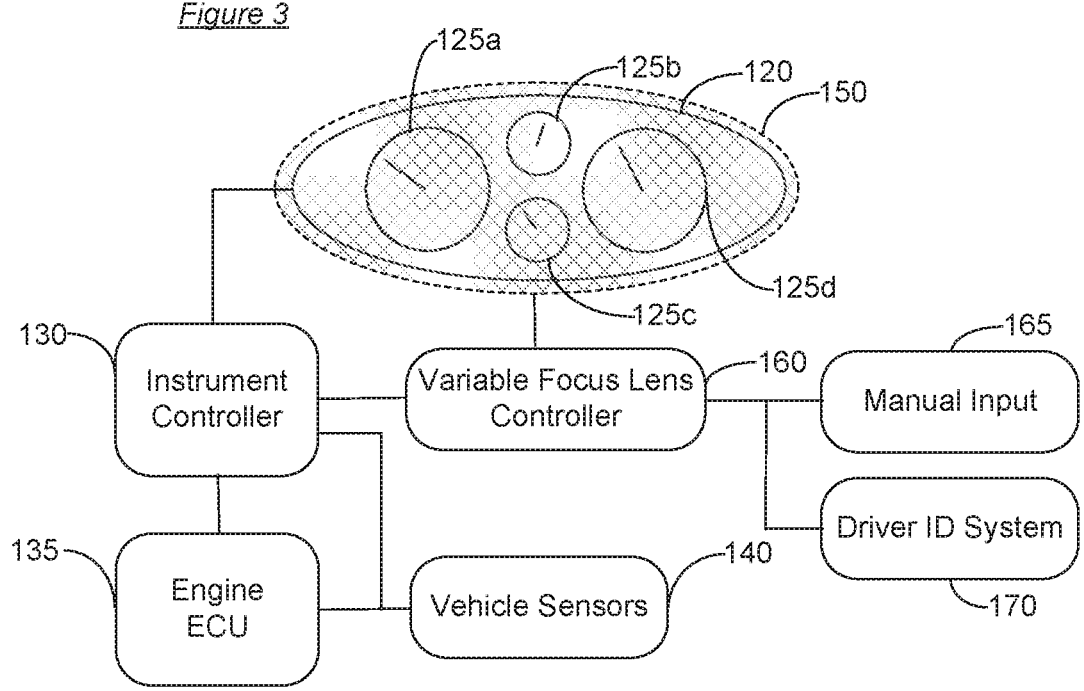
FIG. 3 depicts a motor vehicle dashboard instrument display according to an embodiment of the invention.

FIG. 3 illustrates an embodiment of the present invention. Description of the embodiment uses the exemplary arrangement of FIG. 2 for ease of description. Many alternatives and variations may be envisaged without departing from the scope of the present invention. Vehicle dashboard instrument display 120 comprises variable focus lens system 150. Variable focus lens system 150 comprises a variable focal length lens which at least partially compensates for a driver visual impairment to allow more comfortable reading of instrument display 120. Variable focus lens system 150 overlies and is adjacent to instrument display 120. Variable focus lens system 150 comprises a variable focal length lens.

Different types of variable focal length lens have been described. The following are examples only. It will be apparent that other types of variable focal length lens may be used without departing from the scope of the present invention.

In one type of variable focal length lens a transparent resilient sheet provides at least one of the optical surfaces of the lens and forms at least a part of the outside of a cell structure enclosing a transparent liquid. A reservoir of liquid is linked to the cell structure. Pumping means are operable for pumping liquid to and from the cell structure to increase or decrease respectively the volume of liquid contained by the cell structure. Changing the volume of liquid changes the curvature of the at least one optical surface and so changes the focal length of the lens.

In another type of variable focal length lens, a body of the lens comprises a layer of an electro-optical material whose index of refraction changes dependent on the value of a voltage applied across the material. The electro-optical material may comprise a liquid crystal material. Different values applied by an electrode or electrode array to different areas of the layer locally vary the index of refraction. The combination of the areas provides a lens whose focal length may be changed dependent on changing the voltages applied to the various areas.

Variable focus lens system 150 links by signal communication with variable focus lens controller 160, for example by electrical signal communication via a wired or wireless connection. Although shown as a separate component for clarity, it will be apparent that variable focus lens controller 160 may form part structurally of another vehicle component, for example instrument controller 130 or engine ECU 135 illustrated. Variable focus lens controller 160 communicates control signals to variable focus lens system 150 to change the lens focal length. Variable focus lens controller 160 may comprise a manually adjustable input mechanism 165 to set the focal length of the variable focus lens of lens system 150, for example a rotary knob or a touch pad. Manual input of a selected focal length may also be via a touch interface of a vehicle control touchscreen display or via a voice-controlled command input mechanism. Alternatively, or in addition, the focal length may be set dependent upon identification of the driver by a driver identification system 170 and retrieval of a stored focal length setting relating to that driver.

In a known vehicle system, adjustable vehicle settings are adjusted according to a set of stored values of adjustable vehicle parameters, for example seat height, vehicle internal temperature, mirror adjustment, or other adjustable parameters. These may be linked to an individual driver and stored as a driver profile maintained by a vehicle electronic control device, which may be ECU 135 or a separate controller, for example, in signal communication with adjustment means for adjusting adjustable vehicle parameters. Identification of a driver may be for example, by a vehicle entry system recognizing a personalized key or keyless vehicle entry card by signal communication with the key or card which is brought into contact with or proximity with the vehicle. Recognition by the vehicle entry system of the key or keyless entry card linked to a driver causes the controller, which may be ECU 135, to change adjustable parameters to values linked to that driver profile. These driver profile settings may have been previously set and linked to the key or keyless entry card by the driver.

In one embodiment of the present invention, focal length of variable focus lens of lens system 150 is one of the adjustable settings. In this embodiment, a driver may set the desired focal length as one element of their driver profile. In an example of use, a driver may approach the vehicle. The vehicle driver identification system 170, which may comprise part of the vehicle entry system, identifies a keyless entry card or a key upon its operation to unlock the vehicle, and links this to its stored driver profile. Vehicle electronic control device, which may be ECU 135 or a separate controller, signals vehicle systems to adjust vehicle parameters to match the stored driver profile, including the focal length of variable focus lens of lens system 150.

Figure 4:
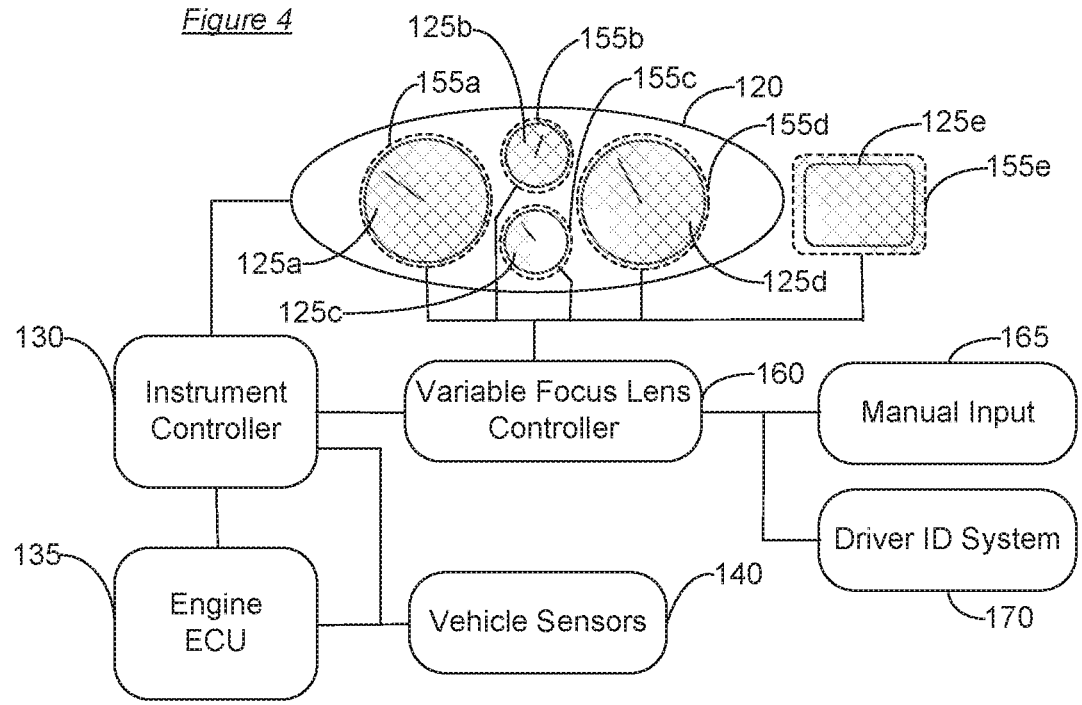
FIG. 4 depicts a motor vehicle dashboard instrument display according to an alternative embodiment of the invention.

FIG. 4 illustrates an alternative embodiment. In this embodiment, each individual instrument 125a-125e comprises a variable focus lens system, 155a-155e respectively. Instrument 125e is an example instrument not linked directly to vehicle sensors, for example a navigation system such as a satellite navigation system (satnav) receiving Global Positioning System (GPS) signals. The area of variable focus lens system required is reduced in this embodiment. For some types of variable focal length lens, this embodiment also simplifies implementation, for example where the variable focal length lens is of a type which comprises a liquid filled resilient walled cell structure. Instruments may be set at differing distances from a driver which may require different levels of compensation. Variable focus lens controller 160 may set the focal length of variable focal length lenses of variable focus lens systems 155a-155e of instruments 1245a-125e each to a value appropriate to the distance from the driver of the respective instrument.

Embodiments provide methods for countering the visual impairments of a plurality of drivers having differing types and degrees of impairment. The methods thereby provide a vehicle instrument display adaptable to the needs of a variety of drivers without further modification.

FIG. 5 is a flow chart illustrating a method for operating a variable focus lens system for a vehicle dashboard instrument display according to an embodiment of the invention. In one embodiment, at step 210 a driver or other user manually enters a lens focal length setting using manually adjustable input mechanism 165 to variable focus lens controller 160. This may be using, for example, a rotary knob or a touch pad or via a touch interface of a vehicle control touchscreen display.

In another embodiment, vehicle driver identification system 170 identifies a driver at step 220. This may be, for example, as part of a vehicle entry system including key or keyless entry to the vehicle, or as part of a vehicle engine start process. At step 230, vehicle driver identification system 170 retrieves driver profile information including a focal length setting. Vehicle driver identification system 170 inputs the focal length setting at step 240 to variable focus lens controller 160.

In each of the above two embodiments, variable focus lens controller 160 communicates at step 250 the focal length setting information to variable focus lens system 150, 155a-155d which adjusts the focal length of the variable focus lens or lenses at step 260.

Other variations may be envisaged. It is known that degree of visual impairment of a driver may vary depending on other factors, for example the degree of tiredness of the driver, the time of day, or the ambient conditions. In such cases, the driver may manually adjust the focal length of lens of variable focus lens system 150, 155a-155e using manual input 165 linked to variable focus lens controller 160. Alternatively, variable focus lens controller 160 may automatically adjust the focal length of lens of variable focus lens system 150, 155a-155e depending on one or more of these factors, for example time of day. This may be linked to settings in a driver profile retrieved after driver identification by vehicle driver identification system 170.

Illumination of dashboard instrument display 120 or instruments 125a-125e may be variable in brightness. The brightness level may be controlled, for example, by instrument controller 130. The brightness level may be set manually, or automatically, to a value appropriate to ambient lighting conditions. Brightness of the display is a factor which may affect the degree of visual compensation needed by a driver. Instrument controller 130 may communicate current instrument illumination brightness level to variable focus lens controller 160. In response, variable focus lens controller 160 may adjust the focal length of the variable focal length lens of variable focus lens system 150, 155a-155e to a value which is appropriate to the current instrument illumination brightness level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A vehicle dashboard instrument display comprising:
   one or more vehicle instruments for displaying vehicle operating information to a driver;
   a lens system adjacent the one or more instruments and interposed between the driver and the one or more instruments, the lens system comprising a variable focus lens operable for, responsive to input from a lens controller, adjusting to a focal length suitable for countering the visual impairment of the driver to render the one or more instruments more easily readable by the driver,
   wherein the lens system comprises a variable focus lens comprising a cell structure enclosing a transparent liquid, the cell structure comprising a transparent resilient sheet providing at least one of the optical surfaces of the cell structure, and operable for adjusting the lens focal length by changing the volume of the liquid in the cell structure.

2. The vehicle dashboard instrument display of claim 1, wherein the lens system overlays a plurality of instruments.

3. The vehicle dashboard instrument display of claim 1, wherein the lens system overlays a single instrument.

4. The vehicle dashboard instrument display of claim 1, wherein the lens system comprises a variable focus lens comprising a layer of an electro-optical material of variable index of refraction.

5. The vehicle dashboard instrument display of claim 4, wherein the electro-optical material comprises a liquid crystal.

6. The vehicle dashboard instrument display of claim 1, wherein a focal length value is inputted manually.

7. The vehicle dashboard instrument display of claim 1, wherein the focal length is adjusted to a value retrieved from driver profile information.

8. A vehicle dashboard instrument for displaying vehicle operating information to a driver, comprising;
   a lens system adjacent the instrument and interposed between the driver and the instrument, the lens system comprising a variable focus lens operable for, responsive to input from a lens controller, adjusting to a focal length suitable for countering the visual impairment of the driver to render the one or more instruments more easily readable by the driver,
   wherein the lens system comprises a variable focus lens comprising a cell structure enclosing a transparent liquid, the cell structure comprising a transparent resilient sheet providing at least one of the optical surfaces of the cell structure, and operable for adjusting the lens focal length by changing the volume of the liquid in the cell structure.

9. The vehicle dashboard instrument of claim 8, wherein the lens system comprises a variable focus lens comprising a layer of an electro-optical material of variable index of refraction.

10. The vehicle dashboard instrument of claim 9, wherein the electro-optical material comprises a liquid crystal.

11. The vehicle dashboard instrument of claim 8, wherein a focal length value is inputted manually.

12. The vehicle dashboard instrument of claim 8, wherein the focal length is adjusted to a value retrieved from driver profile information.

13. A method for countering the visual impairment of a driver, the method comprising:
   providing a lens system adjacent one or more instruments of a vehicle dashboard and interposed between the driver and the one or more instruments, the lens system comprising a variable focus lens;
   receiving input identifying a lens focal length value appropriate for countering the visual impairment of the driver; and
   adjusting the lens focal length to that value,
   wherein the lens system comprises a variable focus lens comprising a cell structure enclosing a transparent liquid, the cell structure comprising a transparent resilient sheet providing at least one of the optical surfaces of the cell structure, and operable for adjusting the lens focal length by changing the volume of the liquid in the cell structure.

14. The method of claim 13, wherein the lens system comprises a variable focus lens comprising a layer of an electro-optical material of variable index of refraction.

15. The method of claim 14, wherein the electro-optical material comprises a liquid crystal.

16. The method of claim 13, wherein a focal length value is inputted manually.

17. The method of claim 13, wherein the focal length is adjusted to a value retrieved from driver profile information.

18. A computer program product, comprising one or more computer readable hardware storage devices having non-transitory computer readable program code stored therein, said program code containing instructions executable by one or more processes of a computer system to implement a method for countering the visual impairment of a driver, the method comprising:
   providing a lens system adjacent one or more instruments of a vehicle dashboard and interposed between the driver and the one or more instruments, the lens system comprising a variable focus lens;
   receiving input identifying a lens focal length value appropriate for countering the visual impairment of the driver; and
   adjusting the lens focal length to that value,
   wherein the lens system comprises a variable focus lens comprising a cell structure enclosing a transparent liquid, the cell structure comprising a transparent resilient sheet providing at least one of the optical surfaces of the cell structure, and operable for adjusting the lens focal length by changing the volume of the liquid in the cell structure.

* * * * *